United States Patent [19]
O'Brien

[11] Patent Number: 5,271,460
[45] Date of Patent: Dec. 21, 1993

[54] TUBE FASTENER

[75] Inventor: Stephen W. O'Brien, Fort Worth, Tex.

[73] Assignee: Tripac, Inc., Fort Worth, Tex.

[21] Appl. No.: 36,396

[22] Filed: Mar. 24, 1993

[51] Int. Cl.⁵ ............................................. F28F 7/00
[52] U.S. Cl. .................................. 165/178; 285/158; 285/159
[58] Field of Search ............... 165/173, 178; 285/158, 285/159, 189

[56] References Cited

U.S. PATENT DOCUMENTS

| 4,225,161 | 9/1980 | Smith | 285/159 |
| 5,163,716 | 11/1992 | Bolton et al. | 285/158 |

FOREIGN PATENT DOCUMENTS

| 441896 | 1/1968 | Switzerland | 285/158 |
| 2158171A | 11/1985 | United Kingdom | 285/158 |
| 2177472A | 1/1987 | United Kingdom | 285/158 |

Primary Examiner—Allen J. Flanigan
Attorney, Agent, or Firm—Harold E. Meier

[57] ABSTRACT

A fastener for securing a tube assembly to a mating assembly in a sealing engagement includes a vertical member and two integrally formed side members each having an inwardly projecting lip for forming a vertical slot with the vertical member. The mating assembly includes an assembly mount with integrally extending side ribs for engaging the inwardly projecting lip of each side member of the fastener. The tube assembly includes a circular rib near the end of a tube which engages the back of the vertical member of the fastener when the fastener and mating assembly are engaged. An "O-Ring" seal located between the circular rib of the tube and the mating assembly mount is compressed forming a sealing engagement between the tube assembly and the mating assembly.

9 Claims, 2 Drawing Sheets

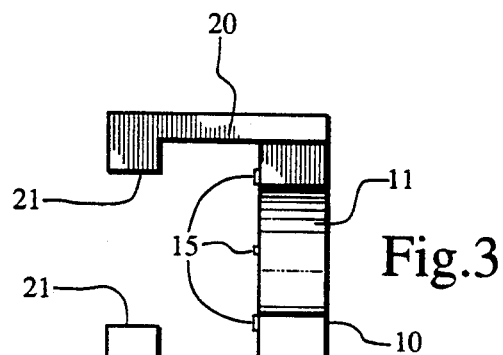
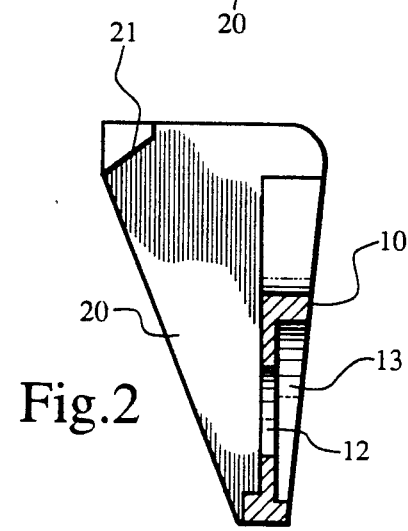
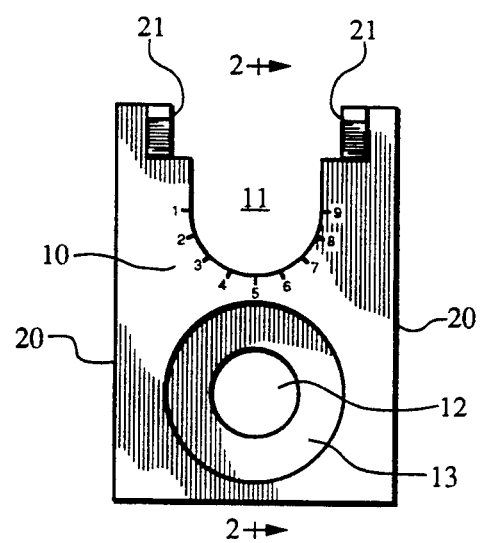
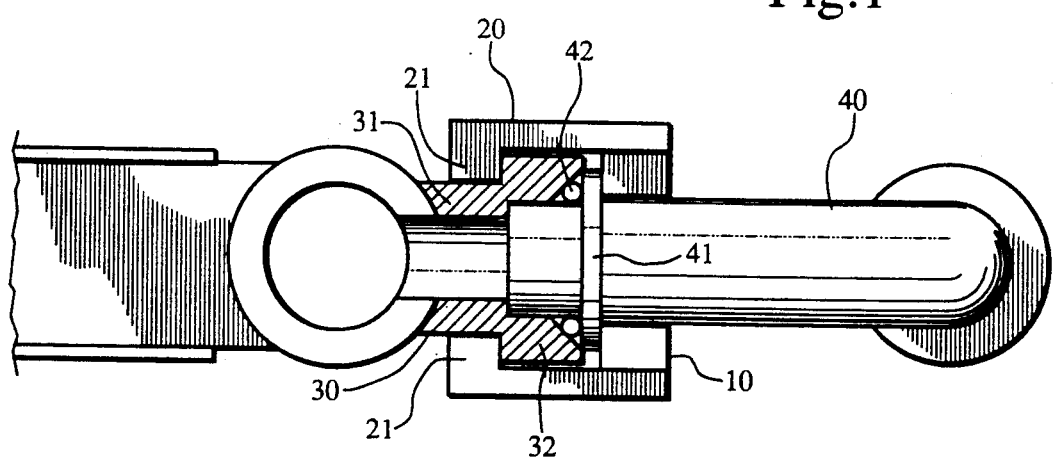

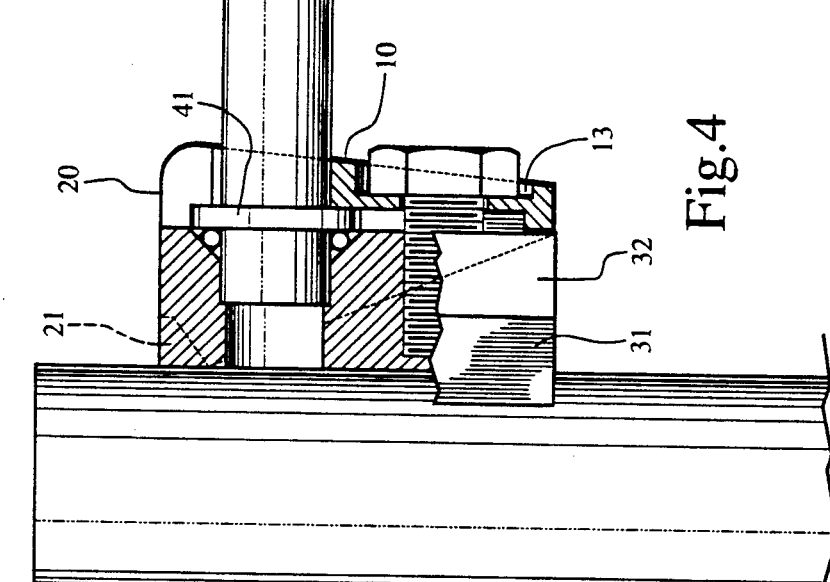
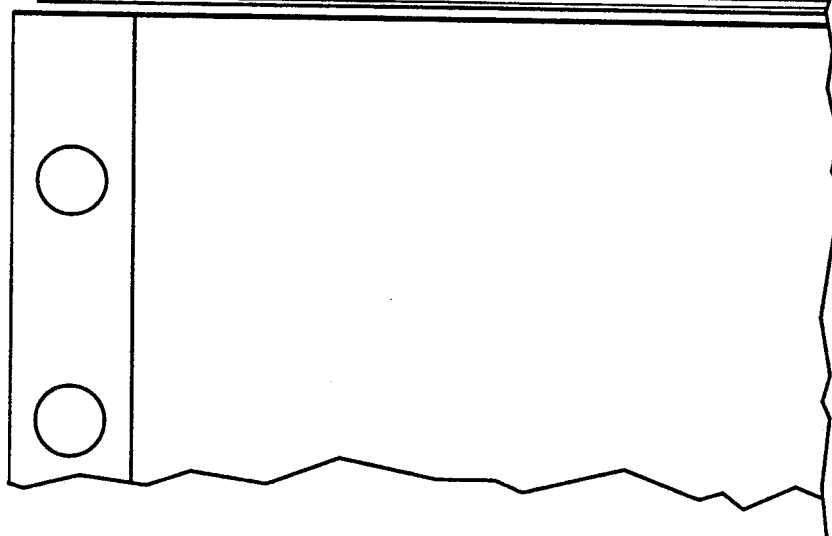

5,271,460

TUBE FASTENER

TECHNICAL FIELD

The present invention relates to a fastener, and in particular a fastener for securing a tube assembly or fitting to a mating assembly.

BACKGROUND OF THE INVENTION

The tube assembly or fitting carrying a refrigerant in an air conditioning system must be securely fastened to the condenser or heat exchanger for proper operation. It is desirable that any fastener should reduce tube assembly costs and allow for a flexible installation.

Typically, the tube assembly which carries the refrigerant to and from the condenser is manufactured and supplied in the specific length and shape necessary for the installation. Because each air conditioning system has a unique tube assembly design requirement, air conditioning suppliers in the aftermarket are forced to maintain extensive inventories of specifically designed tube assemblies at significant cost and risk of obsolescence.

Upon installation, the tube assembly is usually secured to the condenser by a nut type fastener or through the use of a pad or block which is secured by means of a bolt. The problem with using a nut type fastener or a bolted block is controlling the tightening of the nut and the positioning of the tube during installation. If the nut or bolt is over-torqued, there is a risk that the condenser may be damaged through distortion. If the nut or bolt is under-torqued, there is a risk of refrigerant loss with the associated environmental concerns or of incorrectly positioning the tube leading to a possible fracture of the tube.

The present invention includes a fastener for securing a tube assembly to a mating assembly, such as a condenser, that overcomes the foregoing disadvantages. The fastener allows for a reduction in inventory, is easy to install, and provides an environmentally adequate seal between the tube assembly and the condenser.

Inventory and the associated risk of obsolescence is reduced because the fastener and the tube assembly are designed to be used with any air conditioning system. The air conditioning supplied must only stock a set of fasteners and a set of tubes of varying lengths for the tube assembly. The tubes are manufactured straight, but can be bent to any shape required by the installation.

Installation is made easier because the tubes are bent without requiring the installer to assemble a nut or other fastener to the end of the tube. Because the tubes can be easily bent, a very tight bend radius in the tube can be achieved which is critical in many installations because of the tight confines of the engine well. This is also made easier because there is no nut to integrate with the tight bend radius. The tube assembly once properly inserted in the condenser is easily positioned according to one of the tube positioning numbers marked on the fastener. Each tube positioning number corresponds to a particular installation and insures the proper directional alignment of the tube. Once the tube assembly is properly positioned, the fastener is assembled over the end of the tube assembly and securely bolted to the condenser The inner side of the fastener has three projections which lock the tube in position once the bolt is tightened.

Another advantage of the present invention is that the fastener creates an environmentally adequate seal between the tube assembly and the condenser. Before the tube assembly is inserted into the condenser, an "O-Ring" seal is placed over the end of the tube assembly to provide a seal between the tube assembly and the condenser. When the fastener is securely bolted to the condenser, the "O-Ring" seal is compressed creating the environmentally adequate seal.

SUMMARY OF THE INVENTION

The present invention comprises a fastener for securing a tube assembly to a condenser The fastener is assembled around the end of the tube assembly and forms a vertical slot for engaging the condenser mount. The condenser mount is a rectangular block with side ribs which engage the vertical slot of the fastener. The fastener includes an opening for passing a bolt in order to secure the fastener to the condenser mount. An "O-Ring" seal placed over the end of the tube assembly is compressed when the fastener is bolted to the condenser mount providing an environmentally adequate seal between the condenser and the tube assembly.

BRIEF DESCRIPTION OF THE DRAWINGS

A more complete understanding of the present invention may be had by reference to the following Detailed Description when taken in conjunction with the accompanying Drawings wherein:

FIG. 1 is a front view of the fastener of the present invention;

FIG. 2 is a side view of the fastener of FIG. 1;

FIG. 3 is a top view of the fastener of FIG. 2;

FIG. 4 is a side view of the fastener of the present invention securing the tube assembly and fitting to the condenser or heat exchanger;

FIG. 5 is a top view of the fastener securing the tube assembly and fitting to the condenser or heat exchanger; and FIG. 6 is a back view of the fastener illustrating how the tube assembly and fitting are secured to the condenser or heat exchanger.

DETAILED DESCRIPTION OF THE DRAWINGS

Referring now to the Figures; there are shown views of the fastener of the present invention and views of the fastener securing the tube assembly to a condenser. The elements of the present invention are numbered consistently in all of the Figures, and any reference to an element in the following description refers to that element in all of the Figures.

The fastener includes a two part slide lock wherein the first part comprises a vertical member 10 integral with two triangular shaped members 20 extending from said vertical member. The triangular shaped members 20 include an inwardly extending projection in the form of a lip 21 which forms along with the vertical member 10 a vertical slot for engaging a condenser mount 30. The condenser mount 30 consists of a rectangular block 31 with vertical ribs 32 integral with the side edges of the rectangular block.

The vertical member 10 also includes a "U-shaped" indentation 11 extending from one edge of the vertical member 10 to the middle thereof. The "U-shaped" indentation 11 forms an orthogonal slot for receiving the tube assembly 40. The vertical member 10 further includes a series of projections 15 integrally extending from said vertical member near the "U-shaped" indentation 11 for engaging the tube assembly 40. The vertical member 10 further includes an opening 12 located below the "U-shaped" indentation 11 through which a bolt 50 is passed for securing the fastener to the condenser mount 30. The vertical member 10 further includes a circular bore 13 concentric with opening 12 for receiving the head of the bolt 50.

Attached to the tube assembly and fitting 40 is a circular rib 41 near the end of the tube which engages the back of the vertical member 10 when the tube assembly and fitting 40 are fastened to the condenser or heat exchanger. Assembled to the tube assembly and fitting 40 is an "O-Ring" seal 42 located between the circular rib 41 and the end of the tube.

During installation, the tube assembly and fitting 40 is inserted into the opening of the rectangular block 31 of the condenser mount 30. The tubing can then be bent or positioned in any manner required by the particular installation. The tube positioning numbers located along the edge of the vertical member 10 along the "U-shaped" indentation 11 assist the installer in the proper positioning of the tube. Each number corresponds to a particular installation tube position requirement, and the installer must only know this number and bend the tube in the direction associated with that number to properly position the tube.

Once the tube is properly positioned, the fastener of the present invention is slid over the rectangular block 31 such that the inwardly projecting lip 21 of each of the triangular shaped members 20 of the fastener engages the backs of the vertical ribs 32 integral with the side edges of the rectangular block 31. The fastener is assembled over the rectangular block 31 up until the point that the "U-shaped" indentation 11 receives the tube assembly and fitting 40. The circular rib 41 of the tube assembly and fitting 40 engages the series of projections 15 along the back of the vertical member 10 of the fastener securing the tube assembly 40 to the rectangular block 31 of the condenser mount 30. The "O-Ring" seal 42 is compressed as the vertical member 10 engages the circular rib 41 creating a liquid and/or gaseous seal.

A bolt 50 is then inserted through the opening 12 of the vertical member 10 and into the bolt opening 33 of the rectangular block 31 of the condenser mount 30. When the bolt 50 is tightened, the vertical member 10 is secured to the condenser mount 30 and can no longer slide off the condenser mount 30.

Although a preferred embodiment of the invention has been illustrated in the accompanying Drawings and described in the foregoing Detailed Description, it will be understood that the invention is not limited to the embodiment disclosed but is capable of numerous modifications without departing from the scope of the invention as claimed.

I claim:

1. A tube assembly fastener comprising:
   a first part for engaging the tube assembly, the first part including a vertical member and two side members extending substantially perpendicularly from the vertical member, each side member having an inwardly projecting lip to form a vertical slot with the vertical member; and
   a mount adapted to receive said first part, the mount comprising a block including vertical side ribs, each of the side ribs engaging an inwardly projecting lip of said side members for coupling the tube assembly to the block.

2. The tube assembly fastener of claim 1 wherein the first part defines an orthogonal slot for receiving the tube assembly.

3. The tube assembly fastener of claim 1 wherein the first part further comprises an opening for receiving a bolt, whereby said first part is bolted to the mount.

4. The tube assembly fastener of claim 1 further comprising an O-ring seal for sealing between the tube assembly and the block.

5. A fastener for securing a tube assembly to a heat exchanger comprising:
   a first part for engaging the tube assembly, the first part including a vertical member and two generally triangular side members extending substantially perpendicularly from the vertical member, each side member having an inwardly projecting lip to form a vertical slot with the vertical member;
   said vertical member defining an orthogonal slot for receiving said tube assembly; and
   a block including vertical side ribs, each of the side ribs engaging an inwardly projecting lip of said side members for coupling the tube assembly to the block.

6. The fastener of claim 5 wherein the first part further comprises an opening for receiving a bolt, whereby said first part is bolted to the mount.

7. The fastener of claim 1 further comprising an O-ring seal for sealing between the tube assembly and the block.

8. A tube assembly for use in connection with a heat exchanger comprising:
   a tube, including a circular rib adjacent one end of the tube;
   a first part including a vertical member for engaging the circular rib and two generally triangular side members extending substantially perpendicularly from the vertical member, each side member having an inwardly projecting lip, the inwardly projecting lips and vertical member defining a receiving slot;
   said vertical member defining an orthogonal slot for receiving the tube;
   a block including vertical side ribs for engagement with the receiving slot, each of the side ribs engaging an inwardly projecting lip of said side members for coupling the tube assembly to the block; and
   an O-ring seal disposed between the circular rib and the block for sealing the tube assembly.

9. The fastener of claim 8 wherein the first part further comprises an opening for receiving a bolt, whereby said first part is bolted to the mount.

* * * * *